(12) United States Patent
Tuymer

(10) Patent No.: US 7,540,301 B2
(45) Date of Patent: Jun. 2, 2009

(54) COMPRESSOR VALVE

(76) Inventor: Walter Tuymer, 9285 NW. 16th St., Coral Springs, FL (US) 33071

( * ) Notice: Subject to any disclaimer, the term of this patent is extended or adjusted under 35 U.S.C. 154(b) by 160 days.

(21) Appl. No.: 11/646,940

(22) Filed: Dec. 27, 2006

(65) Prior Publication Data

US 2008/0156381 A1     Jul. 3, 2008

(51) Int. Cl.
*F16K 15/08* (2006.01)

(52) U.S. Cl. .............. 137/514; 137/512.1; 137/516.23; 137/516.21

(58) Field of Classification Search ............ 137/516.13, 137/512, 852, 514, 512.1, 516.15, 516.17, 137/516.19, 516.21, 516.23; 251/64
See application file for complete search history.

(56) References Cited

U.S. PATENT DOCUMENTS

| | | | | | |
|---|---|---|---|---|---|
| 3,391,704 | A | * | 7/1968 | Kremer, Jr. | 137/512.1 |
| 4,231,394 | A | * | 11/1980 | Hrabal et al. | 137/512 |
| 4,643,220 | A | * | 2/1987 | Hartshorn | 137/516.13 |
| 4,712,583 | A | * | 12/1987 | Pelmulder et al. | 137/852 |
| 4,854,341 | A | * | 8/1989 | Bauer | 137/514 |
| 4,869,289 | A | * | 9/1989 | Hrabal | 137/512.1 |

\* cited by examiner

*Primary Examiner*—John Rivell
*Assistant Examiner*—Macade Brown
(74) *Attorney, Agent, or Firm*—Donald W. Meeker

(57) ABSTRACT

A steel dampening ring rests on a wafer spring in an annular groove in a compressor valve stop plate to dampen the action of the plastic valve plate to prolong the life of the valve.

10 Claims, 3 Drawing Sheets

COMPRESSOR VALVE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to compressor valves and particularly to a compressor valve with a light weight synthetic valve plate having a single spring loaded steel ring dampening system.

2. Description of Related Art Including Information Disclosed Under 37 CFR 1.97 and 1.98

A good compressor valve has to be efficient and last long. The efficiency is simply a function of the area the valve provides when it is open since the valve is practically an orifice, causing a pressure drop across it which means loss of horsepower. Valve life is achieved by limiting the impact of the valve plate when it opens as well as when it closes. The opening impact can be controlled by limiting the valve lift since the valve plate accelerates over the whole lift, which means the higher the lift, the higher the opening impact. A high lift increases the valve area, to lower the pressure drop. With mass dampening, the opening impact can be reduced. The travel of the damping ring is only important, since the later the valve plate meets the ring, the higher the velocity of the valve plate is and therefore it's energy is higher. A damping lift of 0.015 to 0.020" is sufficient.

Some plate valves use a "double dampening" system. These are basically two plates of the same configuration but the "damping plate" has a stop on the ID limiting its travel to something less than that of the valve plate. Plate valves for reciprocating compressors commonly use a simple spring loaded valve plate. The assumption is that the springs cushion the opening impact of the valve plate and initiate the closing motion of the valve plate before the compressor piston reaches the end of the intake or discharge stroke, so by the time the piston reaches the end of the stroke the valve is closed. There are valves which apply a wafer type spring instead of coil springs which improves the cushioning ability of the spring, since wafer type springs have a non-linear spring characteristic.

There are plate valves known which employ in addition to the valve plate so called damping plates. The damping plates have the same porting as the valve plate and are positioned somewhere between the valve plate and the guard or stop plate. Both plates are guided by a guide ring or are centered on the assembly bolt. Commonly, the valve plates have their own set of springs, which at the valve opening have really no dampening effect. The dampening effect is caused by the mass of the damping plates which, when the valve plates hit the damping plates, have to be accelerated and thereby reduce—or at least check—the velocity the valve plate is traveling with, and therefore reduce the opening impact.

Since the valve plates hardly ever move parallel to the valve seat, the valve plate always makes contact with the damping plate(s) on the outer diameter causing a tilt of the damping plates and also a leveling and a reduction of speed of the valve plate. The only thing which matters here are the mass of the valve plate and the damping plates. The springs have very little effect. The end result is a reduced impact velocity of the valve plate against the guard, thereby prolonging the valve plate life.

U.S. patent application No. 20020144733, published Oct. 10, 2002 by Artner, concerns a ring plate valve for piston compressors, which includes several individual plastic ring plates as closing organs, which are concentrically arranged in relation to each other between valve seat and catcher. The diameter of individual steel spiral springs, that are distributed on the circumference for the purpose of supplying the ring plates with spring force, is essentially equally large as the width of the ring plates, thereby allowing for the realization of a small spring length. On the side of the catcher, the spiral springs are supported and guided inside individual spring cups, preferably of abrasion-resistant plastic.

U.S. Pat. No. 4,854,341, issued Aug. 8, 1989 to Bauer, is for a compressor plate valve having a valve seat with flow passages, a valve guard and a valve plate formed from concentric rings joined together by radial webs. In order to damp the valve plate, and in particular to lessen its impact both on opening and on closing the valve, and to reduce troublesome adhesion between the plates, the valve plate comprises a closure plate of soft material such as plastics, and a guide plate of hard material such as steel. The two plates have the same outline in plan view and lie firmly against each other, the soft closure plate facing the valve seat and the guide plate facing the valve guard. Only the outer ring of the two plates is loaded by springs and is substantially wider than the inner rings.

U.S. Pat. No. 4,852,608, issued Aug. 1, 1989 to Bennitt, concerns a plate-type fluid control valve, which has a ported valve seat, stop plate, and valving element (movable between the plate and seat) biased toward the seat by compression springs. Eight sets of compression springs are employed, in the disclosed embodiment, and each set comprises a pair of helical, counterwound (compression) springs concentrically nested together.

U.S. Pat. No. D336,680, issued Jun. 22, 1993 to Safford, shows the ornamental design for a plate valve bumper.

U.S. Pat. No. 3,428,082, issued Feb. 18, 1969 to Kohler, claims a valve for piston-type compressors comprising a valve seat, a valve guard arranged in a spaced relation to the valve seat, a valve plate disposed between the valve seat and the valve guard, a guide plate for frictionless guidance of the valve plate, and a spring means between the valve plate and the guide plate.

U.S. Pat. No. 1,695,069, issued Dec. 11, 1928 to Tuttle, describes compressor plate valve comprising a valve seat, an annular flat valve plate arranged on the face of the valve seat, and a separate spring guide plate which rests on top of the valve plate.

U.S. Pat. No. 6,817,846, issued Nov. 16, 2004 to Bennitt, discloses a gas compressor and method according to which a piston assembly reciprocates in a bore to draw the fluid to be compressed into the bore during movement of the piston unit in one direction and to compress the fluid during movement of the piston unit in the other direction. FIG. 3 shows an annular dampening plate which is disposed adjacent the valve plate and functions to decelerate the valve plate under conditions to be described to prevent damage caused by impact inertia.

U.S. Pat. No. 3,703,912, issued Nov. 28, 1972 to Bauer, concerns a plate valve especially adapted for use in reciprocating compressors and comprising a valve seat, a valve guard spaced from the valve seat, a valve plate serving as a closing member, and a damping plate interposed between the valve plate and the valve guard.

U.S. Pat. No. 2,870,783, issued Jan. 27, 1959 to Kehler, is for an annular plate valve which has a valve plate, a damping plate, and a spring plate. The spring plate has spring blades thereon which pass through apertures on the damping plate to contact the valve plate, and short spring blades which contact the damping plate.

U.S. Pat. No. 5,036,880, issued Aug. 6, 1991 to Safford, puts forth a valve for reciprocating compressors generally comprising a seat member, a movable plate member, a flat spring plate, and a guard which are assembled as a unitary structure. The seat member and the plate member have linear fluid passage ports which are offset relative to each other. When the valve is in its normal sealing position, the plate member is pressed by linear spring fingers formed on the spring plate against the seat member causing the surface area of the plate member to block the linear fluid passage ports of the seat member. The plate member also has projections extending in a linear or circular direction to receive the spring fingers. When the pressure in the reciprocating compressor becomes sufficiently great, the plate member moves backwards against the spring plate allowing the fluid to move through the valve, including the linear fluid flow passages of both the seat member and plate member.

U.S. Pat. No. 6,510,868, issued Jan. 28, 2003 to Penza, puts forth a compressor valve having a valve seat, a valve guard and a sealing plate with contoured sealing surfaces, the valve seat having defining inlet flow ports for admitting a controlled medium into the valve, the lower surface of the valve seat including at least one seating surface, the a valve guard having a recessed area and defining outlet flow ports for discharging a controlled medium from the valve, the sealing plate being positioned within a cavity between the valve guard and valve seat and moves relative to the lower surface of the valve seat between an open and closed position, the upper surface of the sealing plate defining at least one contoured sealing surface for engaging at least one seating surface of the valve seat along a continuous line of contact when the valve is in the closed position.

U.S. Pat. No. 7,011,111, issued Mar. 14, 2006 to Spiegl, indicates sealing elements for compressor valves. The sealing elements are made of synthetic material having embedded fiber reinforcement, as it has been used for some time for automatic compressor valves, the fiber reinforcement consists of at least one piece of an essentially flat, non-woven fiber fabric, which has, at least in its plane, a directionally independent (random) fiber orientation. Disadvantages of short-fibered reinforced synthetic materials can thereby be avoided, as well as the ones for synthetic materials reinforced by means of long-fibered fabrics, and sealing elements may be obtained thereby having a very high durability.

U.S. Pat. No. 1,593,914, issued Jul. 27, 1926 to Redfield, provides a plate valve with an annular valve plate having opposed notches on the outside diameter thereof which is held in place by clips which engage the notches.

U.S. Pat. No. 3,369,563, issued Feb. 20, 1968 to Deminger, claims a plate valve having a damper plate. The plate valve comprises a valve seat, a valve guard, and a valve plate slidably located between the valve seat and the valve guard, at least one damper plate being slidably arranged between the valve plate and the valve guard in a spaced relation to the latter and slidingly guided jointly with the valve plate on a stepped down guide surface, such as a guide ring, the shoulder thus formed limiting the stroke of the damper plate.

U.S. Pat. No. 3,656,500, issued Apr. 18, 1972 to Mayer, Sr., shows a check valve having a generally cylindrical valve chamber with a valve seat surface at one radial wall of the chamber and spring recesses at the opposite radial wall of the chamber. An annular plate seats against the valve seat surface and coil springs in the recesses bear against the annular plate valve to bias it to closed position. Teflon sleeve members in the spring recesses contain the springs and have notched ends which straddle the annular plate and thus locate it centrally of the valve structure. The notches have a depth to permit opening and closing movement of the plate and the sleeves are self-lubricating with respect to the plate edges, the springs disposed within the sleeve, and cylindrical members between the coil springs and the plate and slidable in the sleeves.

Two U.S. patents, U.S. Pat. No. 4,531,541 issued Jul. 30, 1985 and U.S. Pat. No. 4,570,666 issued Feb. 18, 1986 to Hartshorn, disclose a plate-type valve having a valving element movable between a valve guard and a valve seat. The movable valving element has a plurality of flow ports formed therein each of which communicates with a port formed in the valve guard. Too, the valve seat has ports formed therein, but the latter are out of registry with the valving element and valve guard ports. Accordingly, with the element closed upon the valve seat, fluid flow through the valve is prevented, and with the valving element removed from the seat, fluid flow is accommodated. Movement of the valving element away from and then onto the valve seat subjects the ends of the ports in the valving element to fatigue, failure and fracture. The valve seat has a circular recess formed therein, whereat the periphery of the valving element would impact, and loosely set in the recess is an impact ring. Accordingly, the shock of impact of the plate-type element on closing is less likely to precipitate fatigue and failure of the port ends; the periphery of the valving element impacts upon the impact ring, and the latter dissipates the impact forces.

What is needed is a dampening system used in a plate type compressor valve which provides a single steel ring instead of a plate as a dampening element, having the ring supported by either a wafer spring or a set of coil springs, so it will have a very short travel when the valve plate makes contact with the ring, wherein the mass of the steel ring relative to a plastic valve plate allows for a "soft landing" of the valve plate on the valve guard.

BRIEF SUMMARY OF THE INVENTION

An object of the present invention is to provide a dampening system used in a plate type compressor valve which provides a single steel ring instead of a plate as a dampening element for a plastic valve plate, having the ring supported by a either a wafer spring or a set of coil springs, so it will have a very short travel when the valve plate makes contact with the ring, wherein the mass of the ring allows for a "soft landing" of the valve plate on the valve guard.

In brief, the present invention introduces a steel ring instead of a plate as a dampening means. Since the flow through a compressor valve is almost never symmetrical, the valve plate does not move parallel to the valve seat, but opens in an angle and hits the stop plate with one edge sooner than the rest of the plate. A spring loaded ring is therefore perfectly suitable as a dampening element. In its most basic form there is a plastic valve plate, a simple dampening steel ring and a spring between the stop plate and the dampening ring. The spring allows the dampening ring to travel a small fraction of the valve plate lift, thereby causing a soft stop of the valve plate. The greater mass of the steel ring relative to the plastic valve plate enables the soft stop with the descent of the steel ring controlled by the spring.

A variation of this is the dampening ring having a number of lips on the outside diameter which meet stop pins inserted into the valve seat, thereby limiting the travel of the dampening ring. A pin in the stop plate prevents the rotation of the dampening ring. Another variation has the dampening ring and the wafer spring covering two or more ports, but they are still guided by the stop plate rather then a separate guide ring. The wafer spring could be substituted by a number of coil springs.

The invention is for a dampening system used in a plate type compressor valve. The valve uses a conventional valve seat, a stop plate (or guard) and a ported valve plate, preferably made of a nonmetallic material.

The present invention provides a single ring instead of a plate as a dampening element for a plate. The ring is supported by a wafer spring, so it will have a very short travel when the valve plate makes contact with the ring. The mass of the steel ring compared with the plastic valve plate allows for a "soft landing" of the valve plate on the valve guard.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
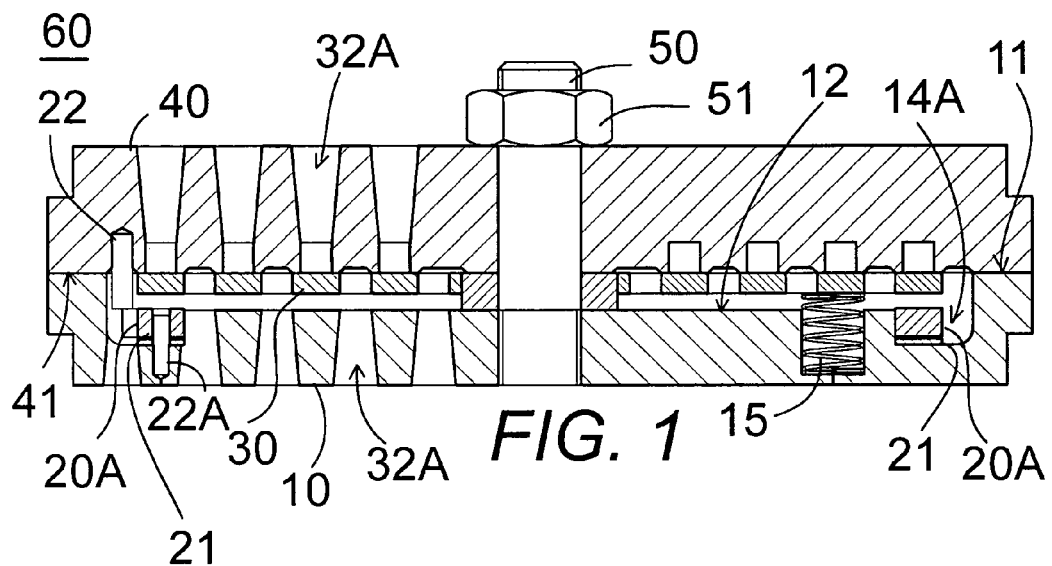
FIG. 1 is a cross-sectional view through the compressor valve assembly of the present invention showing the valve seat, valve stop plate, valve plate, dampening ring with a spring, a stop pin from the valve seat and a pin from the stop plate both for the dampening ring.

In FIGS. 1-6, a plate-type compressor valve assembly device 60 comprises a valve seat 40, a valve stop plate or valve guard 10, a shaft 50 with a nut 51, a ported valve plate 30, preferably made of non-metallic material, such as synthetic material, including plastic, and a dampening ring 20A and 20B with a spring 21, preferably a wafer spring.

The compressor valve comprises a flat cylindrical valve seat 40 having at least one flat face 41 and a parallel flat cylindrical valve stop plate 10 having a peripheral flat surface 11 to mate with a peripheral portion of the flat face 41 of the valve seat and a recessed flat surface 12 spaced apart from the flat face 41 of the valve seat forming an interior plate receiving area therebetween. The stop plate 10 has an annular ring receiving groove 14A, 14B further recessed below the recessed flat surface 12 of the valve stop plate between the recessed flat surface 12 and the peripheral flat surface 11. The valve seat 40 and the valve stop plate 10 each have a series of flow ports or holes 32A to allow a flow of gaseous fluid therethrough.

The valve shaft 50 with nut 51, serves to align the valve seat 40 and the valve stop plate 10 and the valve plate 30.

Figure 3:
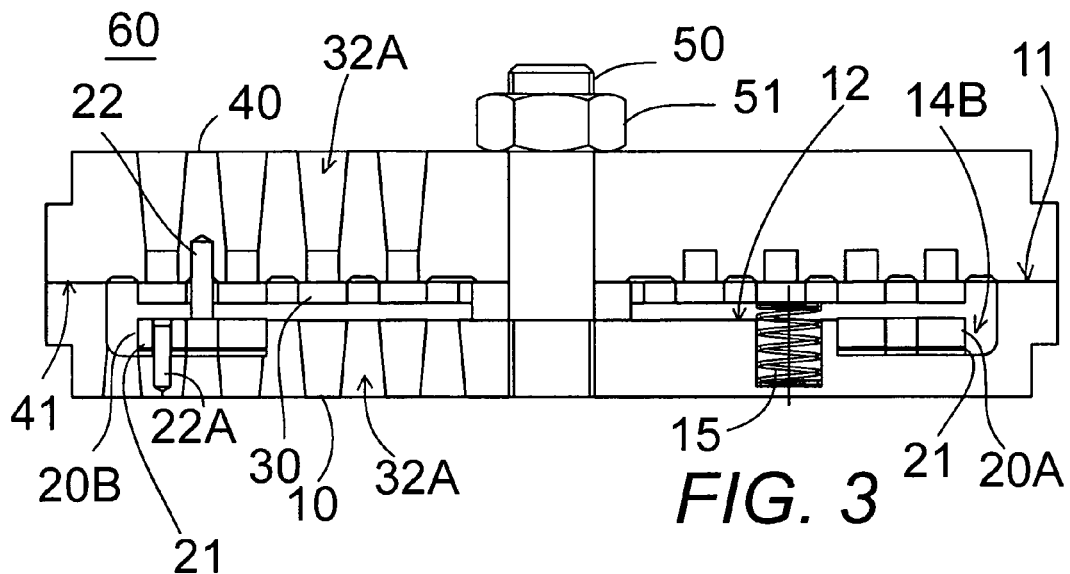
FIG. 3 is a cross-sectional view through the compressor valve assembly of the present invention showing the valve seat, valve stop plate, valve plate, and an alternate dampening ring with a spring.
Figure 5:
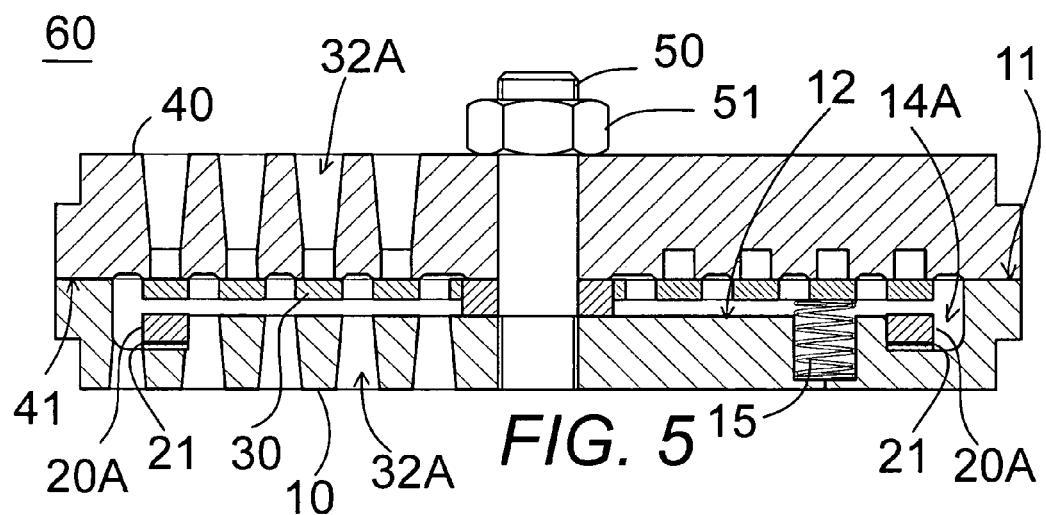
FIG. 5 is a cross-sectional view through the compressor valve assembly of FIG. 1 not showing the stop pins.
Figure 6:
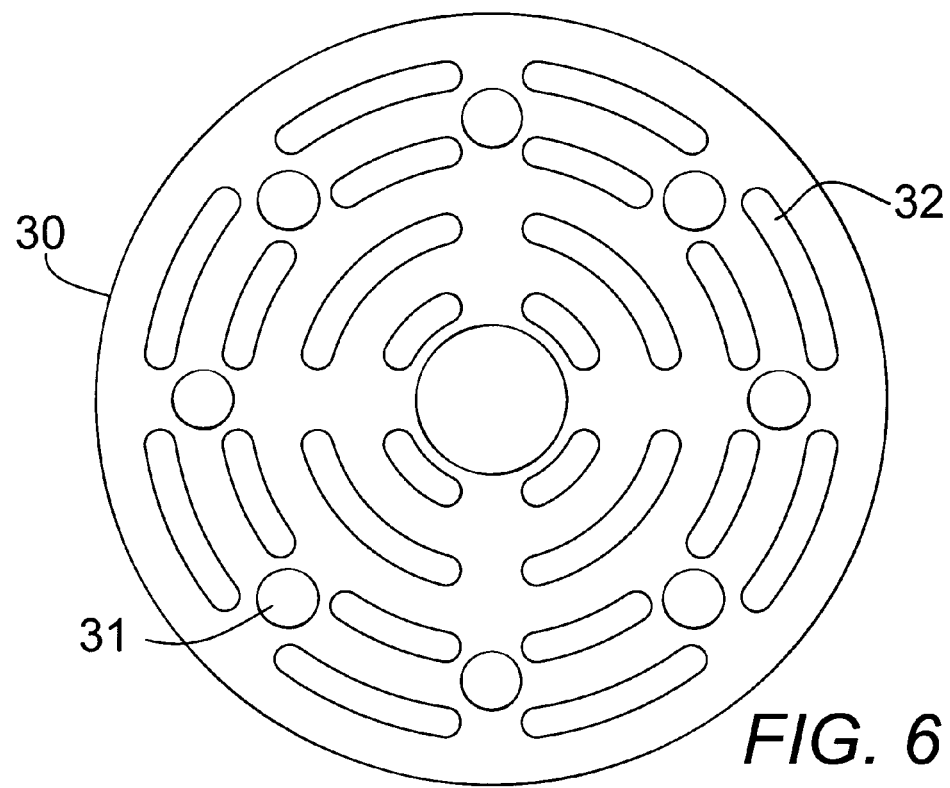
FIG. 6 is a top plan view of the valve plate of the valve assembly of FIGS. 1, 3, and 5.

In FIGS. 1, 3, and 5, the cylindrical valve plate 30 is positioned adjacent to the valve seat 40 within the interior plate receiving area 12, and is movable between the valve seat 40 and the valve stop plate 10. The valve plate 30 is spring-loaded with a compression spring 15. The valve plate 30 has ports 32 to admit fluid therethrough and coil spring contacting areas 31.

In FIGS. 1-5, an annular dampening ring 20A, 20B is positioned within the annular recessed ring receiving area 14A and 14B in alignment with the valve plate 30. At least one spring 21, between the dampening ring 20A, 20B and the valve stop plate 10, elevates the dampening ring above the recessed flat surface 12 of the valve stop plate 10 and so that the valve plate 30 contacts the dampening ring 20A, 20B when the compressor valve is in use. The one or more springs 21 may be either wafer or coil type springs, preferably with at least one wafer spring, but alternatively with at least one coil spring. The dampening ring and the at least one spring 21 dampen the force of the movement of valve plate 30 as the valve plate pushes the dampening ring 20A, 20B downward until the valve plate contacts the recessed interior plate receiving area 12 of the valve stop plate 10 to cause a soft stop of the valve plate. The dampening ring 20A and 20B is preferably formed of a material which gives it a greater mass than the valve plate 30 to assist in dampening. In a preferred embodiment, the dampening ring is fabricated of metal such as steel and the valve plate is formed of a non metallic synthetic material such as plastic. In one embodiment of FIGS. 3 and 4, the dampening ring 20A, 20B cover two or more ports 32 in the valve plate 30.

Figure 2:
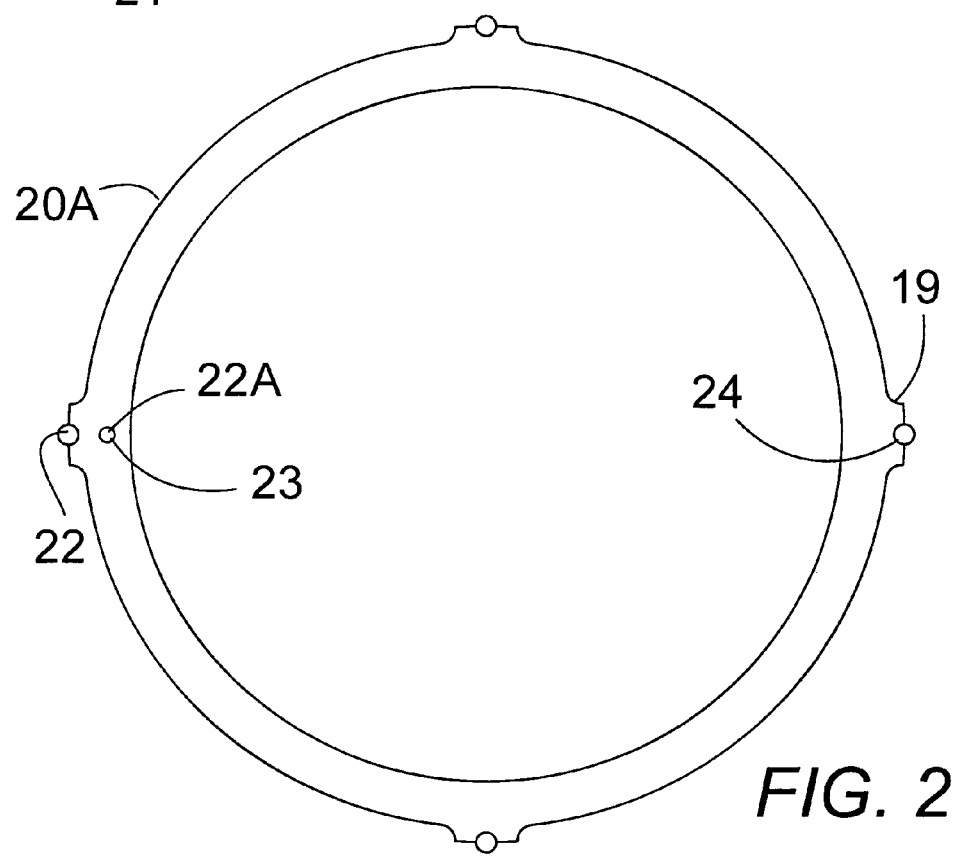
FIG. 2 is a top plan view of the dampening ring of FIG. 1 showing the series of protruding flanges for the stop pins.

In FIGS. 1 and 2, the dampening ring 20A has a series of flanges 19 protruding from a peripheral edge of the dampening ring. The flanges have a series of hemispherical recesses 24, which receive a series of cylindrical stop pins 22 inserted through the valve seat 40 to contact the series of flanges 19 to limit the travel of the dampening ring.

Figure 4:
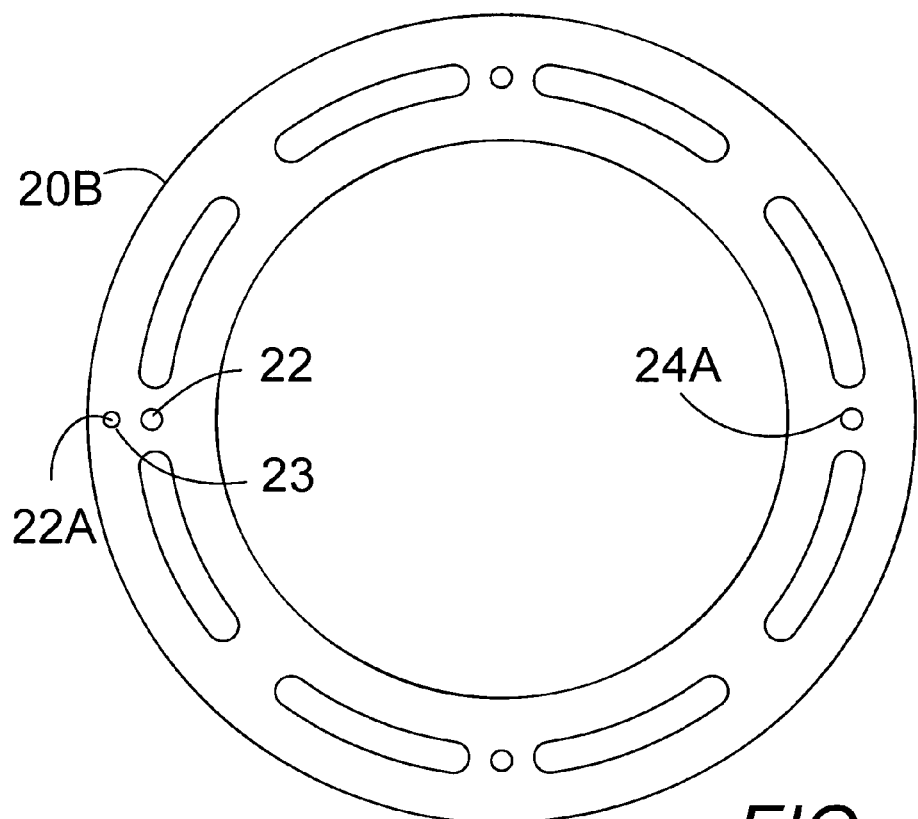
FIG. 4 is a top plan view of the alternate dampening ring of FIG. 2 showing the series of holes for the stop pins.

In FIGS. 3 and 4, the dampening ring 20B further comprises a series of circular holes 24 therethrough for receiving a series of cylindrical stop pins 22 inserted through the valve seat 40 and into the series of circular holes 24A to limit the travel of the dampening ring. The larger area dampening ring 20B requires a wider recessed ring receiving groove 14B.

In FIGS. 1, 2, 3, and 4, the dampening ring 20A, 20B further comprises a circular hole 23 therethrough for receiving a pin 22A inserted through the valve stop plate 10 to insert in the circular hole 23 to prevent rotation of the dampening ring.

It is understood that the preceding description is given merely by way of illustration and not in limitation of the invention and that various modifications may be made thereto without departing from the spirit of the invention as claimed.

What is claimed is:

1. A compressor valve assembly device comprising in combination:

a compressor valve comprising a flat cylindrical valve seat having at least one flat face and a parallel flat cylindrical valve stop plate having a peripheral flat surface to mate with a peripheral portion of the flat face of the valve seat and a recessed flat surface spaced apart from the flat face of the valve seat forming an interior plate receiving area therebetween, the stop plate having an annular ring receiving groove further recessed below the recessed flat surface of the valve stop plate between the recessed flat surface and the peripheral flat surface, the ring receiving groove being radially aligned with an outermost flow port of the valve seat, the valve seat and the valve stop plate each having a series of flow ports therethrough to admit a flow of gaseous fluid therethrough;

a flat cylindrical valve plate positioned adjacent to the valve seat within the interior plate receiving area, the valve plate being movable between the valve seat and the valve stop plate, the valve plate fabricated of a light weight synthetic material;

an annular dampening ring comprising a single annular ring positioned within the annular ring receiving area in alignment with the valve plate and at least one spring between the dampening ring and the valve stop plate, so that the at least one spring elevates the dampening ring above the recessed flat surface of the valve stop plate and so that the valve plate contacts the dampening ring when the compressor valve is in use and the dampening ring and the at least one spring dampens the force of the movement of the valve plate as the valve plate pushes the dampening ring downward until the valve plate contacts the valve stop plate to cause a soft stop of the valve plate, the damping ring fabricated of a heavy steel having a greater mass than the valve plate fabricated of light weight synthetic material so that the greater mass of the steel ring relative to the valve plate fabricated of a light weight synthetic material in combination with the spring allow the dampening ring to travel a small fraction of the valve plate lift and enable the soft stop with the descent of the steel ring controlled by the spring, thereby providing the soft stop to prolong the life of the valve plate.

2. The device of claim 1 wherein the dampening ring is formed of a material which gives it sufficient mass to provide for adequate dampening.

3. The device of claim 1 wherein the dampening ring is formed of a high mass density metal and the valve plate is formed of a low mass density synthetic material.

4. The device of claim 3 wherein and the valve plate is formed of plastic.

5. The device of claim 1 wherein the at least one spring comprises at least one wafer spring.

6. The device of claim 1 wherein the at least one spring comprises at least one coil spring.

7. The device of claim 1 wherein the dampening ring further comprises a series of flanges protruding from a peripheral edge of the dampening ring and further comprising a series of stop pins inserted into the valve seat in contact with the series of flanges to limit the travel of the dampening ring.

8. The device of claim 1 wherein the dampening ring further comprises a series of holes therethrough and further comprising a series of stop pins inserted into the valve seat and into the series of holes in the dampening ring to limit the travel of the dampening ring.

9. The device of claim 1 wherein the dampening ring further comprises a hole therethrough and further comprising a pin extending from the slop plate to prevent the rotation of the dampening ring.

10. The device of claim 1 wherein the dampening ring and the at least one spring cover two or more ports.

* * * * *